(12) United States Patent
Shapiro et al.

(10) Patent No.: US 11,747,193 B2
(45) Date of Patent: *Sep. 5, 2023

(54) LASER FABRICATION WITH BEAM DETECTION

(71) Applicant: Glowforge Inc., Seattle, WA (US)

(72) Inventors: Daniel Shapiro, Mercer Island, WA (US); Mark Gosselin, Seattle, WA (US); Eva Kloiber, Seattle, WA (US); Jared Kofron, Vashon, WA (US); Matthew Sarnoff, Seattle, WA (US)

(73) Assignee: Glowforge Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/682,942

(22) Filed: Feb. 28, 2022

(65) Prior Publication Data
US 2022/0291039 A1 Sep. 15, 2022

Related U.S. Application Data

(63) Continuation of application No. 16/814,820, filed on Mar. 10, 2020, now Pat. No. 11,262,236.
(Continued)

(51) Int. Cl.
*G01J 1/42* (2006.01)
*G01J 5/10* (2006.01)

(52) U.S. Cl.
CPC ............... *G01J 1/4257* (2013.01); *G01J 5/10* (2013.01)

(58) Field of Classification Search
CPC .......... G01J 1/4257; G01J 5/10; G01J 1/1626; G01J 1/10; G01J 1/0219; G01J 1/4228;
(Continued)

(56) References Cited

U.S. PATENT DOCUMENTS 5,136,160 A 8/1992 Nakane et al.
5,355,250 A 10/1994 Grasso et al.
(Continued)

FOREIGN PATENT DOCUMENTS

EP 0954125 A2 11/1999
EP 1309108 A1 5/2003

*Primary Examiner* — Marcus H Taningco
(74) *Attorney, Agent, or Firm* — LEE SULLIVAN SHEA & SMITH LLP

(57) ABSTRACT

A computer numerically controlled machine may include a source of electromagnetic energy. A beam of electromagnetic energy from the source may be delivered to a destination such as, for example, a material positioned in a working area of the computer numerically controlled machine. The beam of electromagnetic energy may be susceptible to interferences while traveling from the source to the destination. The computer numerically controlled machine may include a beam detector configured detect an interference of the beam by measuring a power of the beam of electromagnetic energy at a location between the source and the destination. An interference of the beam may be detected if the power of the beam is less than a threshold value. A controller at the computer numerically controlled machine may perform one or more actions in response to the beam detector detecting the interference of the beam of electromagnetic energy.

20 Claims, 12 Drawing Sheets

Related U.S. Application Data

(60) Provisional application No. 62/833,540, filed on Apr. 12, 2019.

(58) Field of Classification Search
CPC .............. B23K 26/0876; B23K 26/705; B23K 37/0235; B23K 37/0408; B23K 26/38
See application file for complete search history.

(56) References Cited

U.S. PATENT DOCUMENTS

| | | |
|---|---|---|
| 5,475,521 A | 12/1995 | Heidemann |
| 10,340,654 B2 | 7/2019 | Nogiwa et al. |
| 11,262,236 B2 * | 3/2022 | Shapiro .............. B23K 26/0876 |
| 2006/0119699 A1 | 6/2006 | Detmers et al. |
| 2007/0223544 A1 | 9/2007 | Yamazaki et al. |
| 2015/0185091 A1 | 7/2015 | Hasegawa et al. |

* cited by examiner

LASER FABRICATION WITH BEAM DETECTION

CROSS REFERENCE TO RELATED APPLICATION

This application is a continuation of U.S. patent application Ser. No. 16/814,820, filed on Mar. 10, 2020, which claims priority to U.S. Provisional Application No. 62/833,540, filed on Apr. 12, 2019, the contents of each of which are incorporated herein by reference in their entireties.

TECHNICAL FIELD

The subject matter described herein relates to manufacturing processes implementing, or aided by, a computer numerically controlled machine with mechanisms for detecting an interference of electromagnetic energy.

BACKGROUND

Computer controlled manufacturing systems, such as "3-D printers," laser cutter/engravers, computer numerically controlled milling machines, and the like, can be used to create complicated items where traditional manufacturing techniques like moldings or manual assembly fail. Such automated methods operate based on instructions that specify the cuts, layers, patterns, and other actions to be performed. The instructions can be in the form of computer files transferred to the memory of a computer controller for the machine and interpreted at run-time to provide a series of steps in the manufacturing process.

SUMMARY

Systems, methods, and articles of manufacture, including apparatuses, are provided for disabling a computer numerically controlled machine in response to a misdirected electromagnetic beam. In one aspect, there is provided a method that includes: delivering, to a destination in a computer numerically controlled machine, a beam of electromagnetic energy; measuring a power of the beam of electromagnetic energy at a location between a source of the electromagnetic energy and the destination, the beam of electromagnetic energy traveling from the source to the destination being susceptible to one or more interferences, and the one or more interferences being capable of altering the power of the beam of electromagnetic energy by at least diverting, away from an intended path for the beam of electromagnetic energy, at least a portion of the beam of electromagnetic energy; detecting, based at least on the power of the beam of electromagnetic energy being less than a threshold value, an interference of the beam of electromagnetic energy; and in response to detecting the interference of the beam of electromagnetic energy, performing one or more actions.

In some variations, one or more features disclosed herein including the following features can optionally be included in any feasible combination. The power of the beam of electromagnetic energy may be measured by a beam detector. The beam detector may be disposed at a head of the computer numerically controlled machine.

In some variations, the head of the computer numerically controlled machine may be configured to steer, to the destination, the beam of electromagnetic energy from the source of the electromagnetic energy.

In some variations, the beam detector may be configured to measure the power of the beam of electromagnetic energy by least measuring a power of a backscatter from the beam of electromagnetic energy interacting with one or more components at the head of the computer numerically controlled machine.

In some variations, the beam detector may be configured to measure the power of the beam of electromagnetic energy by at least measuring a power of one or more divergent rays scattered from the beam of electromagnetic energy.

In some variations, the beam detector may be configured to measure the power of the beam of electromagnetic energy by least measuring a power of a backscatter from the beam of electromagnetic energy delivered at the destination.

In some variations, the beam detector may be configured to measure the power of the beam of electromagnetic energy by least measuring a power of a portion of the beam of electromagnetic energy.

In some variations, the portion of the beam of electromagnetic energy may be diverted to the beam detector by a bypass that enables the portion of the beam of electromagnetic energy to pass through an optical element configured to steer the beam of electromagnetic energy.

In some variations, the portion of the beam of electromagnetic energy may be diverted to the beam detector by an optical element and/or an optical obstacle inserted along the intended path of the beam of electromagnetic energy.

In some variations, the method may further include: determining an expected power of the beam of electromagnetic energy at the location between the source of the electromagnetic energy and the destination; and detecting the interference of the beam of electromagnetic energy further based on a difference between the power of the beam of electromagnetic energy and the expected power of the beam of electromagnetic energy exceeding another threshold value.

In some variations, the threshold value and/or the other threshold value may be determined based at least on a maximum permissible exposure (MPE) associated with the beam of electromagnetic energy.

In some variations, the expected power of the beam of electromagnetic energy may be determined based at least on an initial power of the beam of electromagnetic energy at the source of the electromagnetic energy and/or an attenuation of the power of the beam of electromagnetic energy as the beam of electromagnetic energy propagates from the source to the destination.

In some variations, the measuring of the power of the beam of electromagnetic energy may include: generating, by a first sensor oriented towards the source of the electromagnetic energy, a first measurement; generating, by a second sensor oriented away from the source of the electromagnetic energy, a second measurement; and determining, based at least on a difference between the first measurement and the second measurement, the power of the beam of electromagnetic energy, the difference between the first measurement and the second measurement corresponding to a contribution from an ambient noise, and the power of the beam of electromagnetic energy being determined by at least removing the contribution from the ambient noise.

In some variations, the measuring the power of the beam of electromagnetic energy may include filtering a signal detected by the first sensor and/or the second sensor to remove the contribution from the ambient noise.

In some variations, the first sensor and/or the second sensor may be configured to detect electromagnetic energy in a far infrared region of the electromagnetic spectrum.

In some variations, the first sensor and/or the second sensor may be thermopiles.

In some variations, the one or more actions may include at least one of generating an alarm, sending a notification to a user, disabling the source of the electromagnetic energy, and engaging an interlock of the computer numerically controlled machine.

In some variations, the one or more actions may include sending, to a cloud-based server, data collected by one or more sensors onboard the computer numerically controlled machine. The data may be over a time period during which the interference of the electromagnetic energy occurred at the computer numerically controlled machine.

In some variations, the one or more interferences may include an absence and/or a malfunction of an optical element configured to direct the beam of electromagnetic energy to the destination.

In some variations, the one or more interferences may include an obstacle introduced to an unprotected portion of the intended path between the source of the electromagnetic energy and the destination.

In another aspect, there is provided an apparatus that includes: a head configured to steer, to a destination, a beam of electromagnetic energy from a source of electromagnetic energy; a beam detector disposed at the head, the beam detector configured to measure a power of the beam of electromagnetic energy at a location between the source of the electromagnetic energy and the destination, the beam of electromagnetic energy traveling from the source to the destination being susceptible to one or more interferences, and the one or more interferences being capable of altering the power of the beam of electromagnetic energy by at least diverting, away from an intended path for the beam of electromagnetic energy, at least a portion of the beam of electromagnetic energy; and a controller configured to detect, based at least on the power of the beam of electromagnetic energy being less than a threshold value, an interference of the beam of electromagnetic energy, and respond to detecting the interference of the beam of electromagnetic energy by performing one or more actions.

In some variations, one or more features disclosed herein including the following features can optionally be included in any feasible combination. The beam detector may be configured to measure the power of the beam of electromagnetic energy by least measuring a power of a backscatter from the beam of electromagnetic energy delivered to the destination and/or the beam of electromagnetic energy interacting with one or more components at the head of the computer numerically controlled machine.

In some variations, the beam detector may be configured to measure the power of the beam of electromagnetic energy by at least measuring a power of one or more divergent rays scattered from the beam of electromagnetic energy.

In some variations, the beam detector may be configured to measure the power of the beam of electromagnetic energy by least measuring a power of a portion of the beam of electromagnetic energy. The portion of the beam of electromagnetic energy may be diverted to the beam detector by a bypass, an optical element, and/or an optical obstacle.

In some variations, the beam detector may include a first sensor oriented towards the source of electromagnetic energy and a second sensor oriented away from the source of electromagnetic energy. A difference between a first measurement generated by the first sensor and a second measurement generated by the second sensor may correspond to a contribution from an ambient noise. The beam detector may be configured to determine the power of the beam of electromagnetic energy by at least removing the contribution from the ambient noise.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
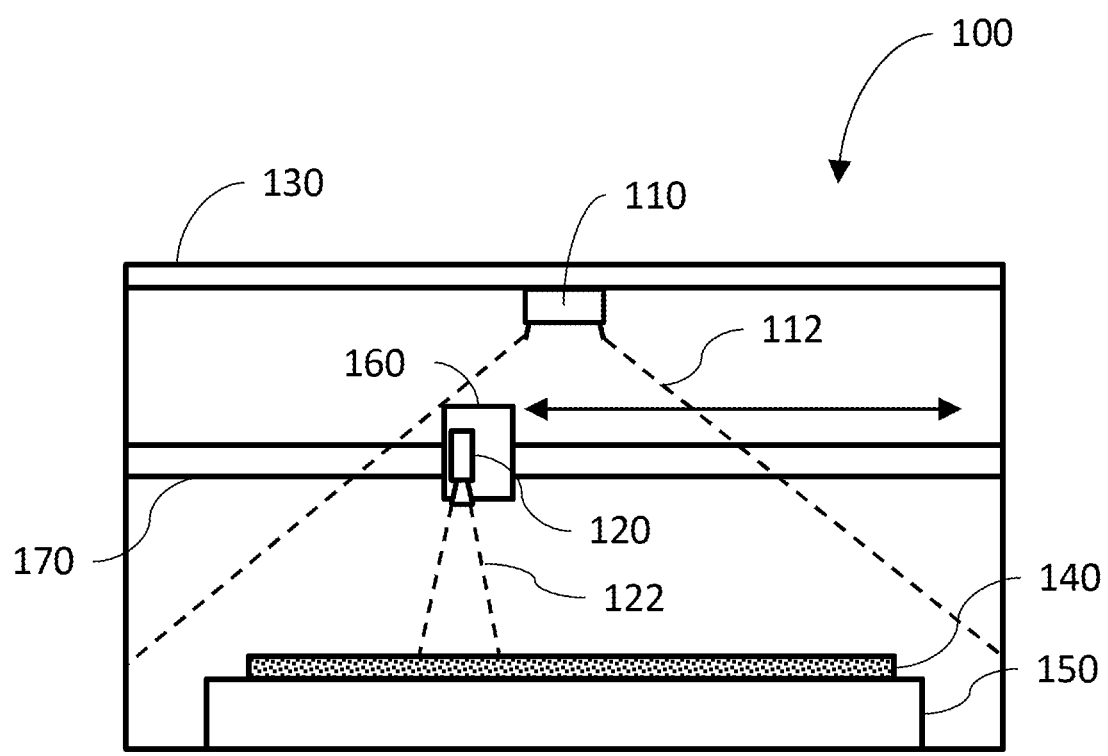
FIG. 1 depicts an elevational view of an example of a computer numerically controlled machine, consistent with some implementations of the current subject matter.

A computer numerically controlled machine may include a source configured to emit electromagnetic energy, for example, in the form of laser. Electromagnetic energy from the source may be routed to a head configured to deliver the electromagnetic energy to a destination such as, for example, a portion of a material positioned in a working area defined by limits within which the head is commanded to cause delivery of the electromagnetic energy. Moreover, the working area may be inside an interior space of the computer numerically controlled machine, which may be defined by a housing including an openable barrier that attenuates the transmission of electromagnetic energy between the interior space and an exterior of the computer numerically controlled machine when the openable barrier is in a closed position.

The electromagnetic energy may be routed from the source to the destination using a series of optical elements including, for example, mirrors, lens, and/or the like. For instance, one or more optical elements (e.g., mirrors, lens, and/or the like) may be disposed between the source and the head of the computer numerically controlled machine in order to route the electromagnetic energy from the source to the head. Furthermore, the head of the computer numerically controlled machine may also include one or more optical elements for routing the electromagnetic energy to the destination (e.g., a portion of the material positioned in the working area).

Accordingly, the electromagnetic energy routed from the source to the destination may undergo one or more optical transformations including, for example, reflection, refraction, and/or the like. For example, a beam of electromagnetic energy may be routed by a first optical element to enter the head of computer numerically controlled machine where a second optical element may further route the beam of electromagnetic energy for delivery to a portion of the working area. The beam of electromagnetic energy delivered to the working area may effect a change in the material positioned in the working area. For instance, the beam of electromagnetic energy may cut, engrave, bleach, cure, and/or burn at least a portion of the material positioned in the working area.

The electromagnetic energy may be susceptible to one or more interferences while traveling from the source of the electromagnetic energy and the destination of the electromagnetic energy. These interferences may be capable of altering a power of the electromagnetic energy including by diverting at least a portion of the electromagnetic energy away from an intended path of the electromagnetic energy. For instance, at least a portion of the path of the electromagnetic energy between the source of the electromagnetic energy and the destination of the electromagnetic energy may be unprotected. One or more obstacles (e.g., errant pieces of material) may be introduced along the unprotected portion of the path and may divert at least a portion of the electromagnetic energy traveling from the source to the destination. Alternatively and/or additionally, the one or more optical elements routing the electromagnetic energy from the source to the destination may be absent and/or malfunction. The absence and/or malfunction of the one or more optical elements may also interfere with the electromagnetic energy by altering a power of the electromagnetic energy including by diverting at least a portion of the electromagnetic energy away from its intended path. Electromagnetic energy diverted from the intended path towards the destination may be capable of causing severe damage to the computer numerically controlled machine and may further injure an operator of the compute numerically controlled machine. Meanwhile, unintentional changes in the power of the electromagnetic energy may diminish an efficacy of the computer numerically controlled machine to effect one or more desired changes in the material positioned in the working area of the computer numerically controlled machine.

As such, in some implementations of the current subject matter, the computer numerically controlled machine may include a beam detector configured to detect an interference of the electromagnetic energy while the electromagnetic energy is traveling from the source of the electromagnetic energy and the destination of the electromagnetic energy. It should be appreciated that the electromagnetic energy may be susceptible to a variety of interferences. For example, the electromagnetic energy may be subject to interferences from obstacles (e.g., errant pieces of material) that are introduced along the path of the electromagnetic energy from the source to the destination, for example, at the unprotected portions of the path. These obstacles may be capable of altering the intended path of the electromagnetic energy, for example, by diverting (e.g., reflect, scatter, absorb, and/or the like) at least a portion of the electromagnetic energy away from its intended path. Alternatively and/or additionally, an absence and/or a malfunction of one or more optical elements along the path of the electromagnetic energy may also interfere with the electromagnetic energy. For example, the power of the electromagnetic energy may be subject to unintentional gains and/or attenuations due to the absent and/or malfunctioning optical elements diverting the electromagnetic energy away from the intended path of the electromagnetic energy.

One or more actions may be performed in response to the beam detector detecting an interference of the electromagnetic energy. For example, the source of the electromagnetic energy may be disabled or the computer numerically controlled machine may be powered off in response to the beam detector detecting an interference of the electromagnetic energy. An interlock system may be engaged to lock an openable barrier of the computer numerically controlled machine and prevent access by a user in response to the beam detector detecting an interference of the electromagnetic energy. The computer numerically controlled machine may also generate an alarm (e.g., an audio alarm, a visual alarm, a haptic alarm, and/or the like) when the beam detector detects an interference of the electromagnetic energy. Alternatively and/or additionally, the computer numerically controlled machine and/or a cloud-based server communicatively coupled with the compute numerically controlled machine may respond to the interference of the electromagnetic energy by at least sending, to the user, a notification message (e.g., by email, short message service (SMS) message, and/or the like). Furthermore, in response to the beam detector detecting an interference of the electromagnetic energy, a report may be generated and sent to the cloud-based server. The report may include data collected by one or more sensors (e.g., cameras, microphones, gyroscopes, accelerometers, and/or the like) onboard the computer numerically controlled machine over a time period during which the interference of the electromagnetic energy occurred at the computer numerically controlled machine.

As noted, interference of electromagnetic energy may occur while a beam of electromagnetic energy is traversing an unprotected portion of the path between the source of the electromagnetic energy and the destination of the electromagnetic energy. The unprotected portion of the path may be disposed directly between the source and the destination of the electromagnetic energy. Alternatively, the unprotected portion of the path may be disposed between the source and the head and/or between the head and the destination of the electromagnetic energy. Accordingly, in some implementations of the current subject matter, the beam detector may detect the interference of the electromagnetic energy by at least measuring a power of the beam of electromagnetic energy subsequent to traversing the unprotected portion of the path from the source of the electromagnetic energy.

For example, the beam detector may be disposed at the head delivering the electromagnetic energy. The beam detector may determine a power of the beam of electromagnetic energy entering the head subsequent to traversing an unprotected portion of the path between the source of the electromagnetic energy and the head delivery the electromagnetic energy. Alternatively and/or additionally, the beam detector may detect a power of the beam of electromagnetic energy delivered at the destination of the electromagnetic energy (e.g., the portion of the material positioned in the working area of the computer numerically controlled machine). An interference of the electromagnetic energy may be detected when the power of the beam of electromagnetic energy determined by the beam detector is less than a threshold value.

The details of one or more variations of the subject matter described herein are set forth in the accompanying drawings and the description below. Other features and advantages of the subject matter described herein will be apparent from the description and drawings, and from the claims. While certain features of the currently disclosed subject matter may be described for illustrative purposes in relation to using machine-vision for aiding automated manufacturing processes (e.g. a computer numerically controlled process), it should be readily understood that such features are not intended to be limiting.

As used herein, the term "cutting" can generally refer to altering the appearance, properties, and/or state of a material. Cutting can include, for example, making a through-cut, engraving, bleaching, curing, burning, etc. Engraving, when specifically referred to herein, indicates a process by which a computer numerically controlled machine modifies the appearance of the material without fully penetrating it. For example, in the context of a laser cutter, it can mean removing some of the material from the surface, or discoloring the material e.g. through an application of focused electromagnetic energy delivering electromagnetic energy as described below.

As used herein, the term "laser" includes any electromagnetic energy or focused or coherent energy source that (in the context of being a cutting tool) uses photons to modify a substrate or cause some change or alteration upon a material impacted by the photons. Lasers (whether cutting tools or diagnostic) can be of any desired wavelength, including for example, microwave, lasers, infrared lasers, visible lasers, UV lasers, X-ray lasers, gamma-ray lasers, or the like.

Also, as used herein, "cameras" includes, for example, visible light cameras, black and white cameras, IR or UV sensitive cameras, individual brightness sensors such as photodiodes, sensitive photon detectors such as a photomultiplier tube or avalanche photodiodes, detectors of infrared energy far from the visible spectrum such as microwaves, X-rays, or gamma rays, optically filtered detectors, spectrometers, and other detectors that can include sources providing electromagnetic energy for illumination to assist with acquisition, for example, flashes, UV lighting, etc.

Also, as used herein, reference to "real-time" actions includes some degree of delay or latency, either programmed intentionally into the actions or as a result of the limitations of machine response and/or data transmission. "Real-time" actions, as used herein, are intended to only approximate an instantaneous response, or a response performed as quickly as possible given the limits of the system, and do not imply any specific numeric or functional limitation to response times or the machine actions resulting therefrom.

Also, as used herein, unless otherwise specified, the term "material" is the material that is on the bed of the computer numerically controlled machine. For example, if the computer numerically controlled machine is a laser cutter, lathe, or milling machine, the material is what is placed in the computer numerically controlled machine to be cut, for example, the raw materials, stock, or the like. In another example, if the computer numerically controlled machine is a 3-D printer, then the material is either the current layer, or previously existent layers or substrate, of an object being crafted by the 3-D printing process. In yet another example, if the computer numerically controlled machine is a printer, then the material can be the paper onto which the computer numerically controlled machine deposits ink.

A computer numerical controlled (computer numerically controlled) machine may be a machine that is used to add or remove material under the control of a computer. There can be one or more motors or other actuators that move one or more heads that perform the adding or removing of material. For computer numerically controlled machines that add material, heads can incorporate nozzles that spray or release polymers as in a typical 3D printer. Alternatively and/or additionally, the heads can include an ink source such as a cartridge or pen. In the case of 3-D printing, material can be built up layer by layer until a fully realized 3D object has been created.

In some implementations of the current subject matter, the computer numerically controlled machine can scan the surface of a material such as a solid, a liquid, or a powder, with a laser to harden or otherwise change the material properties of said material. New material may be deposited. The process can be repeated to build successive layers. For computer numerically controlled machines configured to remove material, the heads can incorporate tools such as blades on a lathe, drag knives, plasma cutters, water jets, bits for a milling machine, a laser for a laser cutter/engraver, etc.

Figure 2:
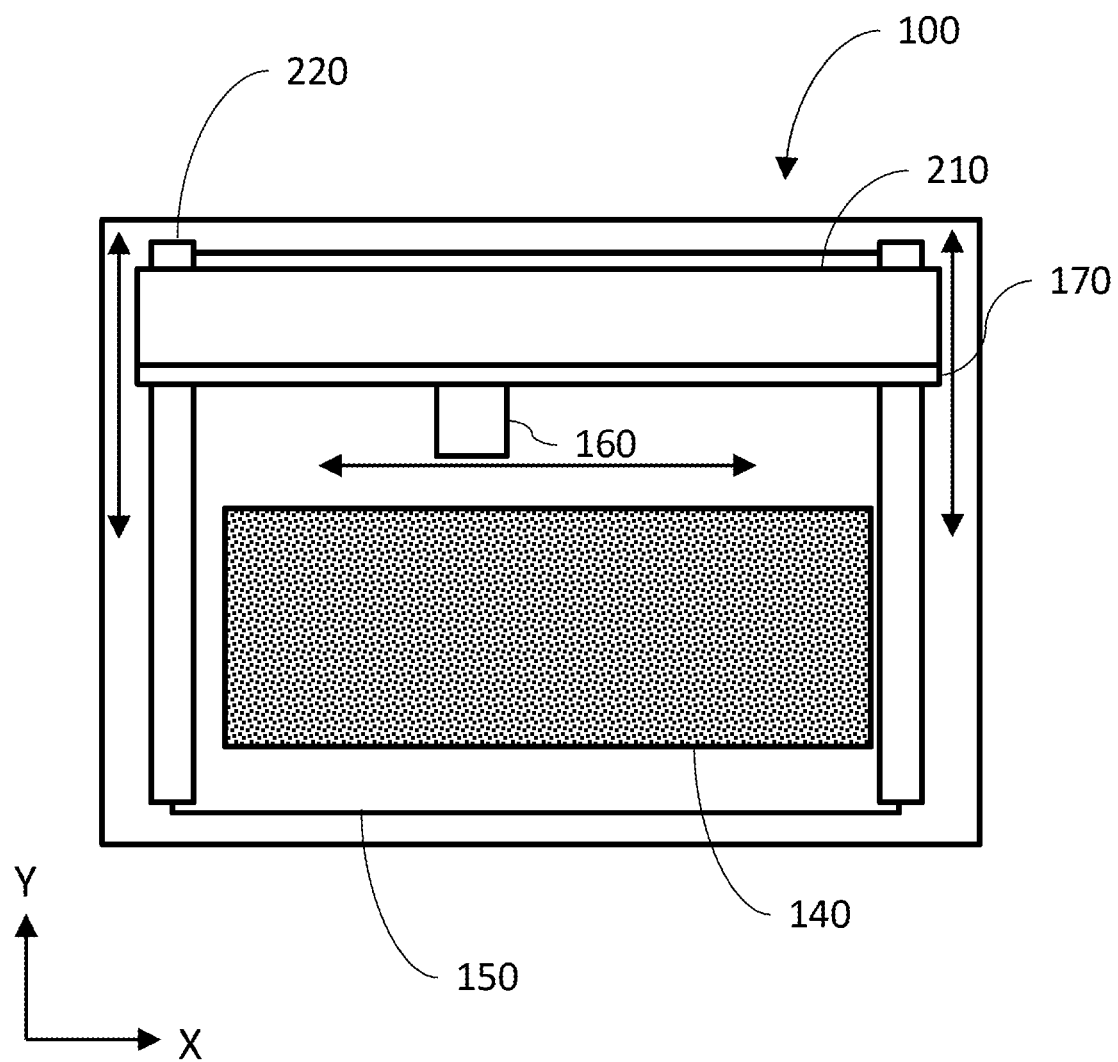
FIG. 2 depicts a top view of an example of a computer numerically controlled machine, consistent with implementations of the current subject matter.

FIG. 1 is depicts an elevational view of an example of a computer numerically controlled machine 100, consistent with implementations of the current subject matter. The example of the computer numerically controlled machine 100 show in FIG. 1 may include a camera positioned to capture an image of an entire material bed 150 and another camera positioned to capture an image of a portion of the material bed 150, consistent with some implementations of the current subject matter. FIG. 2 depicts a top view of the example of the computer numerically controlled machine 100 shown in FIG. 1.

The computer numerically controlled machine 100 shown in FIG. 1 corresponds to one implementation of a laser cutter. While some features are described in the context of a laser cutter, this is by no means intended to be limiting. Many of the features described below can be implemented with other types of computer numerically controlled machines. The computer numerically controlled machine 100 can be, for example, a lathe, engraver, 3D-printer, milling machine, drill press, saw, etc.

While laser cutter/engravers share some common features with computer numerically controlled machines, they have many differences and present particularly challenging design constraints. A laser cutter/engraver is subject to regulatory guidelines that restrict the egress of electromagnetic energy from the unit when operating, making it challenging for light to enter or escape the unit safely, for example to view or record an image of the contents. The beam of a laser cutter/engraver must be routed from the emitter to the area to be machined, potentially requiring a series of optical elements such as lenses and mirrors. The beam of a laser cutter/engraver is easily misdirected, with a small angular deflection of any component relating to the beam path potentially resulting in the beam escaping the intended path, potentially with undesirable consequences. A laser beam may be capable of causing material destruction if uncontrolled. A laser cutter/engraver may require high voltage and/or radio frequency power supplies to drive the laser itself. Liquid cooling is common in laser cutter/engravers to cool the laser, requiring fluid flow considerations. Airflow is important in laser cutter/engraver designs, as air may become contaminated with byproducts of the laser's interaction with the material such as smoke, which may in turn damage portions of the machine for example fouling optical systems. The air exhausted from the machine may contain undesirable byproducts such as smoke that must be routed or filtered, and the machine may need to be designed to prevent such byproducts from escaping through an unintended opening, for example by sealing components that may be opened. Unlike most machining tools, the kerf—the amount of material removed during the operation—is both small and variable depending on the material being processed, the power of the laser, the speed of the laser, and other factors, making it difficult to predict the final size of the object. Also unlike most machining tools, the output of the laser cutter/engraver is very highly dependent on the speed of operation; a momentary slowing can destroy the workpiece by depositing too much laser energy. In many machining tools, operating parameters such as tool rotational speed and volume of material removed are easy to continuously predict, measure, and calculate, while laser cutter/engravers are more sensitive to material and other conditions. In many machining tools, fluids are used as coolant and lubricant; in laser cutter/engravers, the cutting mechanism does not require physical contact with the material being affected, and air or other gasses may be used to aid the cutting process in a different manner, by facilitating combustion or clearing debris, for example.

The computer numerically controlled machine 100 can have a housing surrounding an enclosure or interior area defined by the housing. The housing can include walls, a bottom, and one or more openings to allow access to the computer numerically controlled machine 100, etc. There can be a material bed 150 that can include a top surface on which the material 140 generally rests.

In the implementation of FIG. 1, the computer numerically controlled machine can also include an openable barrier as part of the housing to allow access between an exterior of the computer numerically controlled machine and an interior space of the computer numerically controlled machine. The openable barrier can include, for example, one or more doors, hatches, flaps, and the like that can actuate between an open position and a closed position. The openable barrier can attenuate the transmission of light between the interior space and the exterior when in a closed position. Optionally, the openable barrier can be transparent to one or more wavelengths of light or be comprised of portions of varying light attenuation ability. One type of openable barrier can be a lid 130 that can be opened or closed to put material 140 on the material bed 150 on the bottom of the enclosure. Various example implementations discussed herein include reference to a lid. It will be understood that absent explicit disclaimers of other possible configurations of the operable barrier or some other reason why a lid cannot be interpreted generically to mean any kind of openable barrier, the use of the term lid is not intended to be limiting. One example of an openable barrier can be a front door that is normally vertical when in the closed position and can open horizontally or vertically to allow additional access. There can also be vents, ducts, or other access points to the interior space or to components of the computer numerically controlled machine 100. These access points can be for access to power, air, water, data, etc. Any of these access points can be monitored by cameras, position sensors, switches, etc. If they are accessed unexpectedly, the computer numerically controlled machine 100 can execute actions to maintain the safety of the user and the system, for example, a controlled shutdown. In other implementations, the computer numerically controlled machine 100 can be completely open (i.e. not having a lid 130, or walls). Any of the features described herein can also be present in an open configuration, where applicable.

The computer numerically controlled machine 100 can have one or more heads including, for example, the head 160, which can be operated to alter the material 140. The head 160 may be configured to steer a beam of electromagnetic energy to a desired location on the material 140 positioned in the working area of the computer numerically controlled machine 100. For instance, the head 160 may be movable including by translating and/or rotating to locate the beam of electromagnetic energy. It should be appreciated that the computer numerically controller machine 100 may include multiple heads that operate independently or in unison to locate the beam of electromagnetic energy.

In some implementations of the current subject matter, the head 160 can be configured to include a combination of optical, electronic, and/or mechanical components that can, in response to commands, cause a laser beam or electromagnetic energy to be delivered to cut or engrave the material 140. The computer numerically controlled machine 100 can also execute operation of a motion plan for causing movement of the movable head. As the movable head moves, the movable head can deliver electromagnetic energy to effect a change in the material 140 that is at least partially contained within the interior space. In one implementation, the position and orientation of the optical elements inside the head 160 can be varied to adjust the position, angle, or focal point of a laser beam. For example, mirrors can be shifted or rotated, lenses translated, etc. The head 160 can be mounted on a translation rail 170 that is used to move the head 160 throughout the enclosure. In some implementations the motion of the head can be linear, for example on an X axis, a Y axis, or a Z axis. In other implementations, the head can combine motions along any combination of directions in a rectilinear, cylindrical, or spherical coordinate system.

A working area for the computer numerically controlled machine 100 can be defined by the limits within which the movable head can cause delivery of a machining action, or delivery of a machining medium, for example electromagnetic energy. The working area can be inside the interior space defined by the housing. It should be understood that the working area can be a generally three-dimensional volume and not a fixed surface. For example, if the range of travel of a vertically oriented laser cutter is a 10"×10" square entirely over the material bed 150, and the laser from the laser beam comes out of the laser cutter at a height of 4" above the material bed of the computer numerically controlled machine, that 400 in$^2$ volume can be considered to be the working area. Restated, the working area can be defined by the extents of positions in which material 140 can be worked by the computer numerically controlled machine 100, and not necessarily tied or limited by the travel of any one component. For example, if the head 160 could turn at an angle, then the working area could extend in some direction beyond the travel of the head 160. By this definition, the working area can also include any surface, or portion thereof, of any material 140 placed in the computer numerically controlled machine 100 that is at least partially within the working area, if that surface can be worked by the computer numerically controlled machine 100. Similarly, for oversized material, which may extend even outside the computer numerically controlled machine 100, only part of the material 140 might be in the working area at any one time.

The translation rail 170 can be any sort of translating mechanism that enables movement of the head 160 in the X-Y direction, for example a single rail with a motor that slides the head 160 along the translation rail 170, a combination of two rails that move the head 160, a combination of circular plates and rails, a robotic arm with joints, etc.

Components of the computer numerically controlled machine 100 can be substantially enclosed in a case or other enclosure. The case can include, for example, windows, apertures, flanges, footings, vents, etc. The case can also contain, for example, a laser, the head 160, optical turning systems, cameras, the material bed 150, etc. To manufacture the case, or any of its constituent parts, an injection-molding process can be performed. The injection-molding process can be performed to create a rigid case in a number of designs. The injection molding process may utilize materials with useful properties, such as strengthening additives that enable the injection molded case to retain its shape when heated, or absorptive or reflective elements, coated on the surface or dispersed throughout the material for example, that dissipate or shield the case from laser energy. As an example, one design for the case can include a horizontal slot in the front of the case and a corresponding horizontal slot in the rear of the case. These slots can allow oversized material to be passed through the computer numerically controlled machine 100.

Optionally, there can be an interlock system that interfaces with, for example, the openable barrier, the lid 130, door, and the like. Such an interlock is required by many regulatory regimes under many circumstances. The interlock can then detect a state of opening of the openable barrier, for example, whether a lid 130 is open or closed. In some implementations, an interlock can prevent some or all functions of the computer numerically controlled machine 100 while an openable barrier, for example the lid 130, is in the open state (e.g. not in a closed state). The reverse can be true as well, meaning that some functions of the computer numerically controlled machine 100 can be prevented while in a closed state. There can also be interlocks in series where, for example, the computer numerically controlled machine 100 will not operate unless both the lid 130 and the front door are both closed. Furthermore, some components of the computer numerically controlled machine 100 can be tied to states of other components of the computer numerically controlled machine, such as not allowing the lid 130 to open while the laser is on, a movable component moving, a motor running, sensors detecting a certain gas, etc. In some implementations, the interlock can prevent emission of electromagnetic energy from the movable head when detecting that the openable barrier is not in the closed position.

As noted, the computer numerically controlled machine 100 may include a source configured to generate and/or emit a beam of electromagnetic energy, for example, in the form of a laser beam. The beam of electromagnetic energy may be delivered to a destination such as, for example, a portion of the material 140 positioned in the working area of the computer numerically controlled machine 100. Delivering the beam of electromagnetic energy to the portion of the material 140 may effect one or more changes in the material 140 including by, for example, cutting and/or engraving the material 140. In some implementations of the current subject matter, the beam of electromagnetic energy may travel directly from the source to the destination. Alternatively, the computer numerically controlled machine 100 may further include the head 160 including one or more optical, electronic, and mechanical components configured to cause the beam of electromagnetic energy to be delivered to the destination. Electromagnetic energy emitted by the source can be routed to the head 160 using one or more optical elements including, for example, mirrors, lenses, and/or the like. For example, a beam of electromagnetic energy from the source may be routed by a first optical element to enter the head 160 where a second optical element may further route the beam of electromagnetic energy for delivery to the material 140 positioned in the working area.

Nevertheless, at least a portion of the path of the electromagnetic energy between the source and the destination may be unprotected. The beam of electromagnetic energy may therefore be susceptible to one or more interferences (e.g., errant pieces of the material 140) while traversing the unprotected portion of the path from the source to the destination. These interferences may alter the power of the beam of electromagnetic energy including by diverting at least a portion of the beam of electromagnetic energy away from its intended path. Moreover, the unprotected portion of the path traversed by the electromagnetic energy may not be covered by a material capable of attenuating the electromagnetic energy. As such, in the event the beam of the electromagnetic energy is subject to interferences along the unprotected portion of the path, there would be no containment to prevent errant electromagnetic energy from causing severe damage. Accordingly, in some implementations of the current subject matter, the computer numerically controlled machine 100 may further include a beam detector configured to detect an interference of the electromagnetic energy.

Moreover, one or more actions may be performed in response to the beam detector detecting an interference of the electromagnetic energy. For example, the computer numerically controlled machine 100 may include a controller configured to disable the source of the electromagnetic energy and/or lock the lid 130 of the computer numerically controlled machine 100 (e.g., by engaging an interlock system) in response to the beam detector detecting the interference of the electromagnetic energy. The controller at the computer numerically controlled machine 100 may also generate an alarm (e.g., an audio alarm, a visual alarm, a haptic alarm, and/or the like) when the beam detector detects an interference of the electromagnetic energy. Alternatively and/or additionally, the controller at the computer numerically controlled machine 100 and/or a cloud-based server communicatively coupled with the compute numerically controlled machine 100 may respond to the interference of the electromagnetic energy by at least sending, to the user, a notification message (e.g., by email, short message service (SMS) message, and/or the like). Furthermore, in response to the beam detector detecting an interference of the electromagnetic energy, the controller at the computer numerically controlled machine 100 may generate and send, to the cloud-based server, a report including data collected by one or more sensors (e.g., cameras, microphones, gyroscopes, accelerometers, and/or the like) onboard the computer numerically controlled machine 100 over a time period during which the interference of the electromagnetic energy occurred at the computer numerically controlled machine 100.

The beam detector may be disposed at various locations along the path traversed by the beam of electromagnetic energy from the source to the destination including, for example, at one or more locations before and/or after the unprotected portion of the path where the beam of electromagnetic energy is susceptible to interferences. For example, in some implementations of the current subject matter, the beam detector may be disposed at the head 160 of the computer numerically controlled machine 100. The beam detector disposed at the head 160 of the computer numerically controlled machine 100 may be configured to detect an interference of the beam of electromagnetic energy traversing through an unprotected portion of the path between the source of the beam of electromagnetic energy and the head 160 and/or between the head 160 and the destination of the beam of electromagnetic energy (e.g., the material 140 positioned in the working area of the computer numerically controlled machine 100).

Nevertheless, it should be appreciated that the beam detector may be detected at a different location than the head 160 of the computer numerically controlled machine 100. For example, in some implementations of the current subject matter, the beam detector may be disposed at any location outside of the source of the electromagnetic energy in order to detect an interference of the beam of electromagnetic energy traversing through an unprotected portion of the path between the source and the destination of the beam of electromagnetic energy (e.g., the material 140 positioned in the working area of the computer numerically controlled machine 100).

Figure 3:
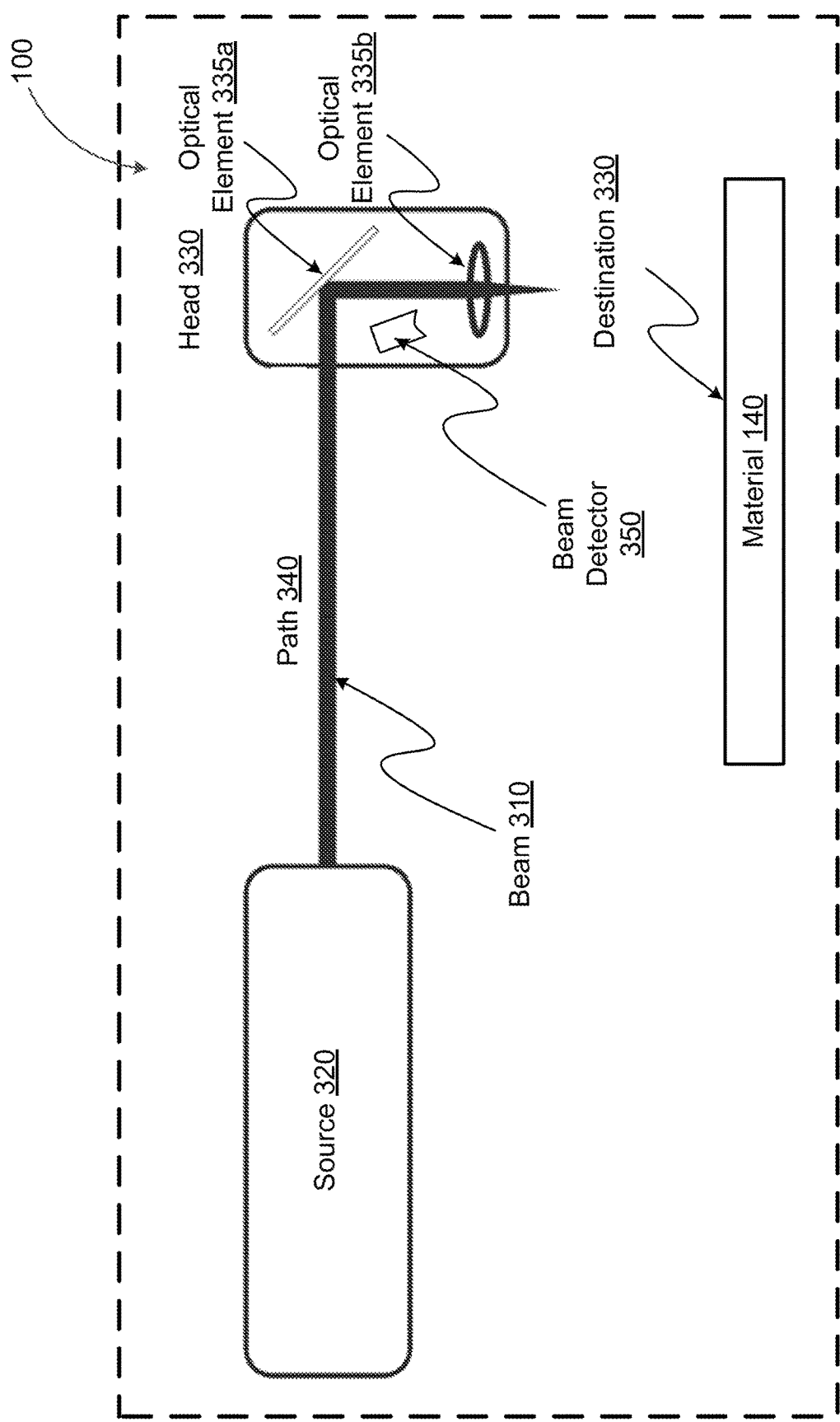
FIG. 3 depicts a block diagram illustrating a beam of electromagnetic energy traveling from a source of the electromagnetic energy to a destination of the electromagnetic energy in a computer numerically controlled machine, consistent with implementations of the current subject matter.

To further illustrate, FIG. 3 depicts a beam 310 of electromagnetic energy traveling from a source 320 of the electromagnetic energy to a head 160 of the electromagnetic energy in the computer numerically controlled machine 100, consistent with implementations of the current subject matter. Referring to FIGS. 1-3, the source 320 may be configured to generate and/or emit an electromagnetic energy, for example, by generating and/or emitting the beam 310. Meanwhile, the head 160 may be the head 160 of the computer numerically controlled machine 100. As such, the head 160 may include one or more optical, electronic, and mechanical components configured to cause the beam 310 to be delivered to the material 140 in order, for example, to cut and/or engrave the material 140. For example, FIG. 3 shows the head 160 as including a first optical element 335*a* and a second optical element 335*b*. The first optical element 335*a* may be one or more mirrors configured to change a path 340 of the beam 310 incident upon the first optical element 335*a* including by directing the beam 310 towards the second optical element 335*b*. Meanwhile, the second optical element 335*b* may be one or more lenses configured to focus the beam 310 for delivery to the material 140.

Once the beam 310 exits the source 320, the beam 310 may traverse the path 340 in order to reach a destination 330, which may be at least a portion of the material 140 positioned in a working area of the computer numerically controlled machine 100. The path 340 may be a three-dimensional volume within an interior space of the computer numerically controlled machine 100. Moreover, least a portion of the path 340 may be unprotected such that the beam 310 may be susceptible to one or more interferences capable of altering the power of the beam 310 including by diverting the beam 310 away from its intended path. To detect an interference of the beam 310, the computer numerically controlled machine 100 may include a beam detector 350.

In the example shown in FIG. 3, the beam detector 350 may be disposed at the head 160 of the computer numerically controlled machine 100. However, as noted, it should be appreciated that the beam detector 350 may be disposed at a different location along the path 340 of the beam 310. Moreover, the computer numerically controlled machine 100 may include multiple beam detectors disposed at different locations along the path 340 of the beam 310.

In some implementations of the current subject matter, the beam detector 350 may be measure a power of the beam 310 at the head 160 (and/or at a different location along the path 340 of the beam 310). For example, the beam detector 350 may measure the power of the beam 310 by at least sampling the beam 310 at the head 160 (and/or at a different location along the path 340 of the beam 310). An interference of the beam 310 may be detected when the power of the beam 310 being less than a threshold value.

One or more actions may be performed in the event the beam detector 350 detects an interference of the beam 310. For example, a controller at the numerically controlled machine 100 may disable the source 320 to prevent further generation and/or emission of electromagnetic energy at the source 320. The source 320 may be disabled in order to minimize the damage caused by errant electromagnetic energy that may be generated when the beam 310 is diverted as a result of the interferences along the path 340. Alternatively and/or additionally, the controller at the computer numerically controlled machine 100 may respond to the beam detector 350 detecting an interference of the beam 310 by engaging the interlock system and locking the lid 130 of the computer numerically controlled machine 100. Locking the lid 130 may prevent a user from accessing the interior space of the computer numerically controlled machine 100 when errant electromagnetic energy may be present within the computer numerically controlled machine 100.

The controller at the computer numerically controlled machine 100 may also generate an alarm (e.g., an audio alarm, a visual alarm, a haptic alarm, and/or the like) when the beam detector 350 detects an interference of the beam 310. Alternatively and/or additionally, the controller at the computer numerically controlled machine 100 and/or a cloud-based server communicatively coupled with the compute numerically controlled machine 100 may respond to the interference of the beam 310 by at least sending, to the user, a notification message (e.g., by email, short message service (SMS) message, and/or the like). Furthermore, in response to the beam detector detecting an interference of the beam 310, the controller at the computer numerically controlled machine 100 may generate and send, to the cloud-based server, a report including data collected by one or more sensors (e.g., cameras, microphones, gyroscopes, accelerometers, and/or the like) onboard the computer numerically controlled machine 100 over a time period during which the interference of the beam 310 occurred at the computer numerically controlled machine 100.

It should be appreciated that the beam detector 350 may also be configured to perform one or more actions in response to detecting an interference of the beam 310. For example, the beam detector 350 may be configured to modulate the power of the beam 310 output by the source 320 in response to the detecting the interference of the beam 310.

In some implementations of the current subject matter, the one or more actions that are performed in response to the beam detector 350 detecting an interference of the beam 310 and the triggers associated with the actions may be configured based on one or more safety thresholds. For example, the source 320 of the beam 310 may be disabled in response to the beam detector 350 determining that the power of the beam 310 exceeds a maximum permissible exposure (MPE). Alternatively and/or additionally, the source 320 of the beam 310 may be disabled within a threshold quantity of time when, for example, the power of the beam 310 is determined to exceed the maximum permissible exposure (MPE).

Figure 4A:
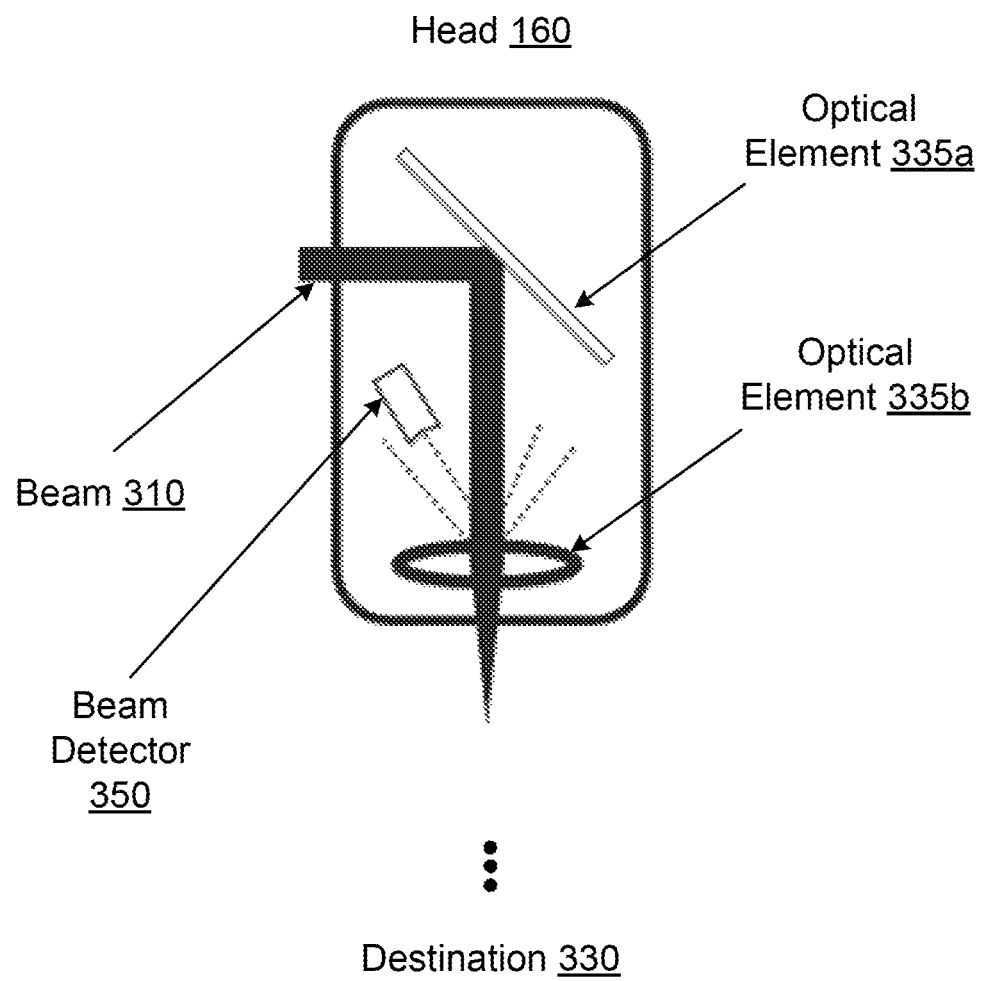
FIG. 4A depicts a block diagram illustrating an example configuration of a beam detector, consistent with implementations of the current subject matter.

FIG. 4A depicts a block diagram illustrating an example configuration of the beam detector 350, consistent with implementations of the current subject matter. Referring to FIGS. 1-3 and 4A, the beam 310 from the source 320 may be collimated such that the beam 310 may exhibit minimal spread as the beam 310 propagates, for example, from the source 320 to the head 160. Nevertheless, at least some of the rays forming the beam 310 may scatter and diverge from the primary beam 310. Accordingly, in the example shown in FIG. 4A, the beam detector 350 disposed at the head 160 may be configured to measure the power of the beam 310 by at least measuring a power of the divergent rays scattered from the beam 310. Alternatively and/or additionally, the beam detector 350 in the example shown in FIG. 4A may be configured to measure the power of the beam 310 by at least measuring a power of the backscatter electromagnetic energy generated when the beam 310 interacts with the second optical element 335*b*.

Figure 4B:
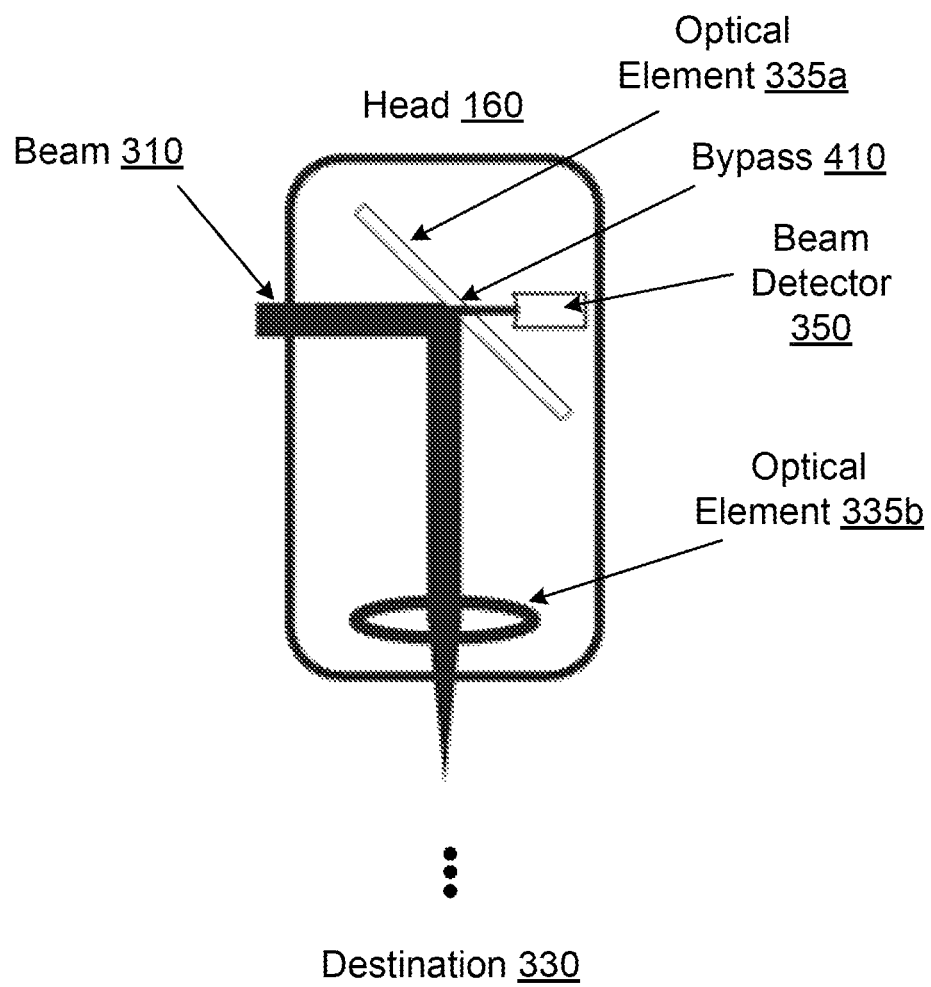
FIG. 4B depicts a block diagram illustrating another example configuration of a beam detector, consistent with implementations of the current subject matter.

FIG. 4B depicts a block diagram illustrating another example configuration of the beam detector 350, consistent with implementations of the current subject matter. As shown in FIG. 4B, in some implementations of the current subject matter, the one or more optical elements the computer numerically controlled machine 100 may include a bypass that enables the beam detector 350 to sample a portion of the beam 310 interacting with the one or more optical elements. For example, FIG. 4B shows the first optical element 335*a* as including a bypass 410, which may be an aperture such as pinhole, a slit, and/or the like.

The bypass 410 may be configured to enable a portion of the beam 310 incident upon the first optical element 335*a* to pass through the first optical element 335*a* instead of being directed towards the second optical element 335*b*. In doing so, the bypass 410 may enable the portion of the beam 310 to reach the beam detector 350, which may be positioned and/or oriented relative to the first optical element 335*a* to receive the portion of the beam 310 passing through the bypass 410. Accordingly, the beam detector 350 may measure the power of the beam 310 by at least measuring a power of the portion of the beam 310 that passes through the bypass 410. It should be appreciated that the bypass 410 may be configured to divert a minimal portion of the beam 310. For example, the portion of the beam 310 diverted by the bypass 410 may enable the beam detector 350 to determine the power of the beam 310 without diminishing the power of the beam 310 delivered to the material 140.

Figure 4C:
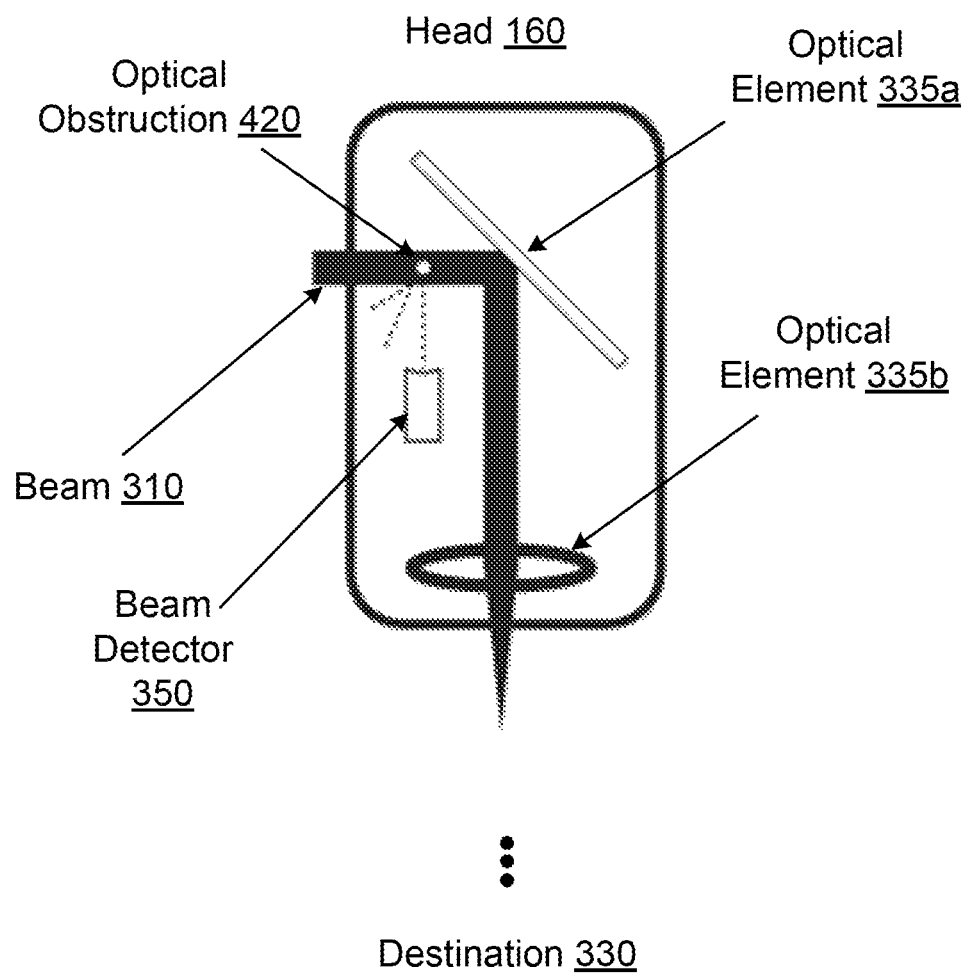
FIG. 4C depicts a block diagram illustrating another example configuration of a beam detector, consistent with implementations of the current subject matter.

FIG. 4C depicts a block diagram illustrating another example configuration of the beam detector 350, consistent with implementations of the current subject matter. Referring to FIG. 4C, in some implementations of the current subject matter, an optical obstruction 420 maybe inserted along the path 340 of the beam 310 in order to divert at least a portion of the beam 310 for sampling by the beam detector 350. That is, the beam detector 350 may be configured to measure the power of the beam 310 by at least measuring a power of a portion of the beam 310 diverted to the beam detector 350 by the optical obstruction 420. In the example shown in FIG. 4C, the optical obstruction 420 may be a wire configured to scatter a portion of the beam 310 towards the beam detector 350. The optical obstruction 420 may be configured to divert a minimal portion of the beam 310 in order to avoid diminishing the power of the beam 310 delivered to the destination 330 (e.g., the material 140). Moreover, the optical obstruction 420 may be a different type of obstacle capable of scattering a portion of the beam 310.

Figure 4D:
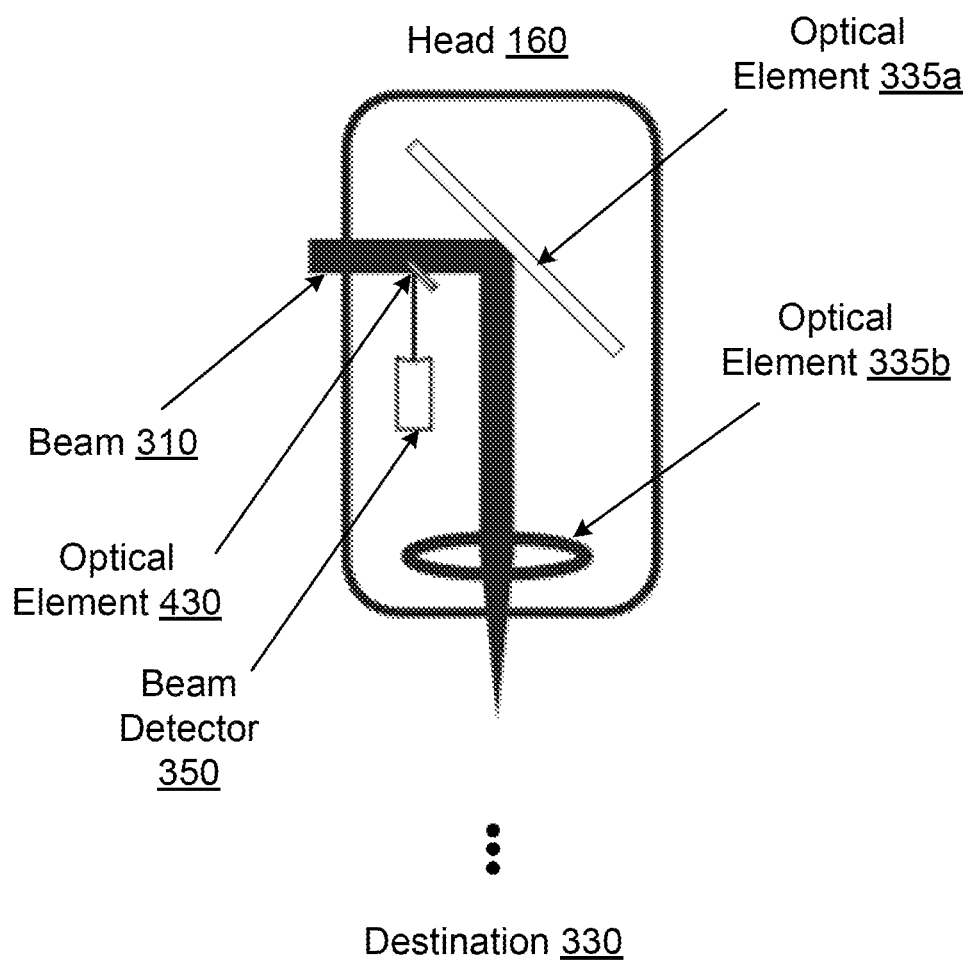
FIG. 4D depicts a block diagram illustrating another example configuration of a beam detector, consistent with implementations of the current subject matter.
Figure 4E:
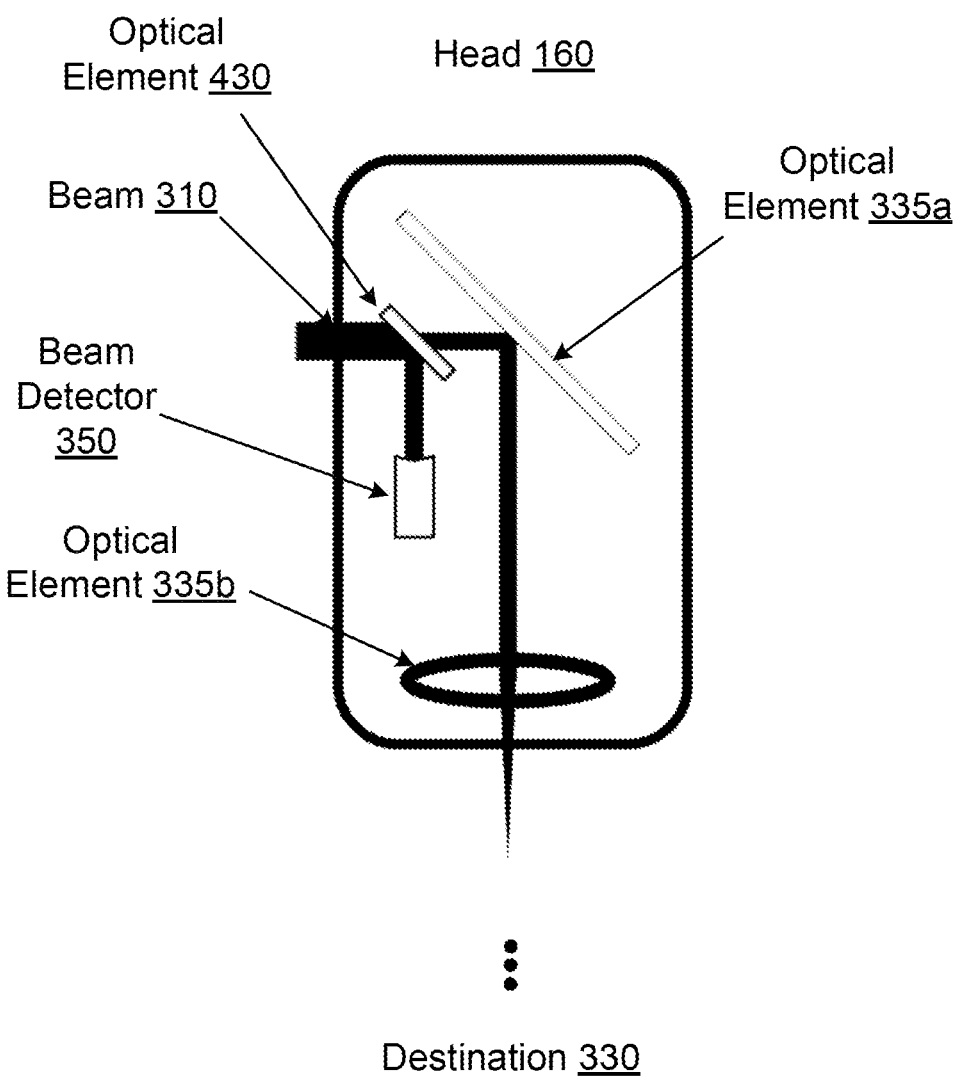
FIG. 4E depicts a block diagram illustrating another example configuration of a beam detector, consistent with implementations of the current subject matter.

FIGS. 4D-E depict block diagrams illustrating other example configurations of the beam detector 350, consistent with implementations of the current subject matter. Referring to FIGS. 4D-E, a third optical element 430 may be inserted along the path 340 of the beam, 310 in order to divert at least a portion of the beam 310 for sampling by the beam detector 350. In the example shown in FIG. 4D, the third optical element 430 may be a lens configured to split the beam 310 such that a portion of the beam 310 is directed towards the beam detector 350. Alternatively, FIG. 4E shows another example in which the third optical element 4E0 may be slivered mirror configured to direct a first portion of the beam 310 towards the beam detector 350 while allowing a second portion of the beam 310 to bypass (e.g., through the sliver) through the third optical element 430 to reach the first optical element 335*a*. The third optical element 430 may be configured to divert a minimal portion of the beam 410, which may enable the beam detector 350 to determine the power of the beam 310 without diminishing the power of the beam 310 delivered to the destination 330 (e.g., the material 140).

Figure 4F:
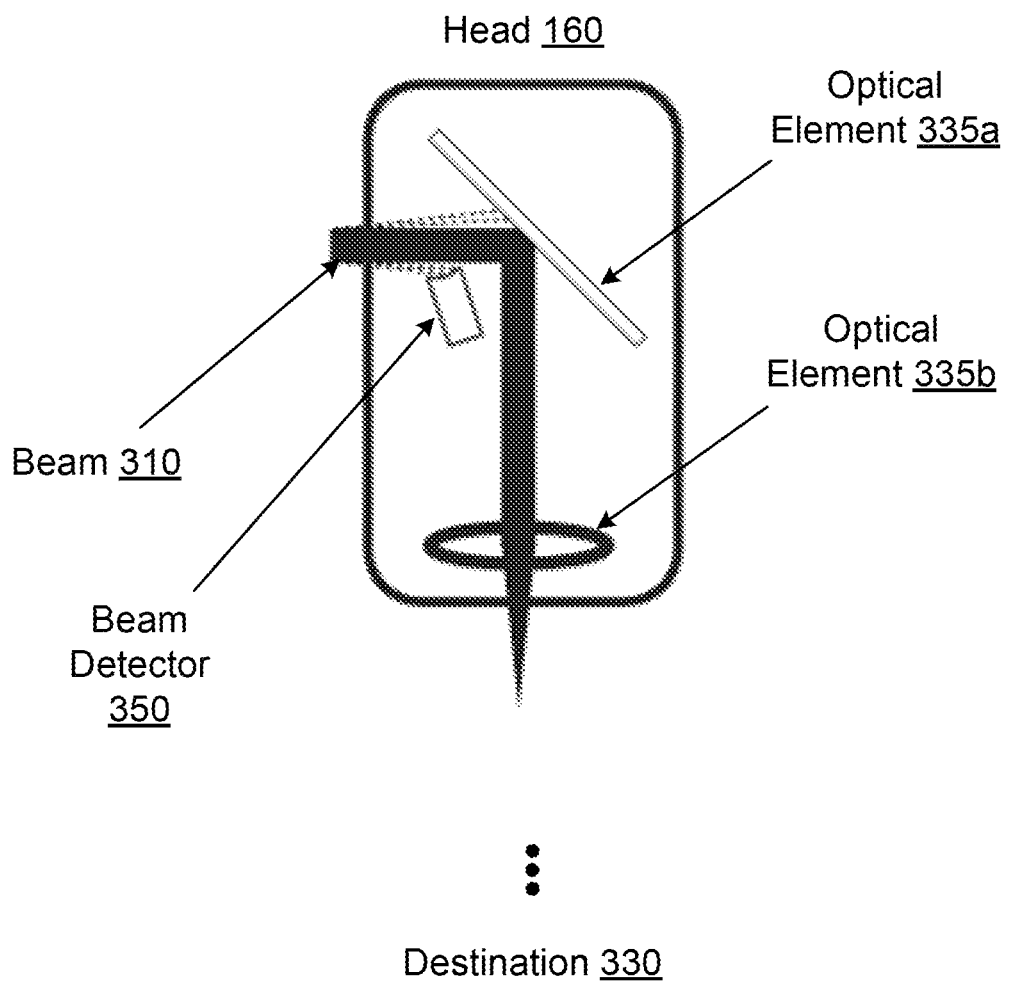
FIG. 4F depicts a block diagram illustrating another example configuration of a beam detector, consistent with implementations of the current subject matter.

FIG. 4F depicts a block diagram illustrating another example configuration of the beam detector 350, consistent with implementations of the current subject matter. As noted, the beam 310 from the source 320 may be collimated but at least of the rays forming the beam 310 may nevertheless diverge as the beam 310 propagates from the source 320 to the head 160. Accordingly, in the example shown in FIG. 4E, the beam detector 350 may be positioned and/or oriented to measure the power of the beam 310 by at least measuring a power of the divergent rays from the beam 310.

Figure 4G:
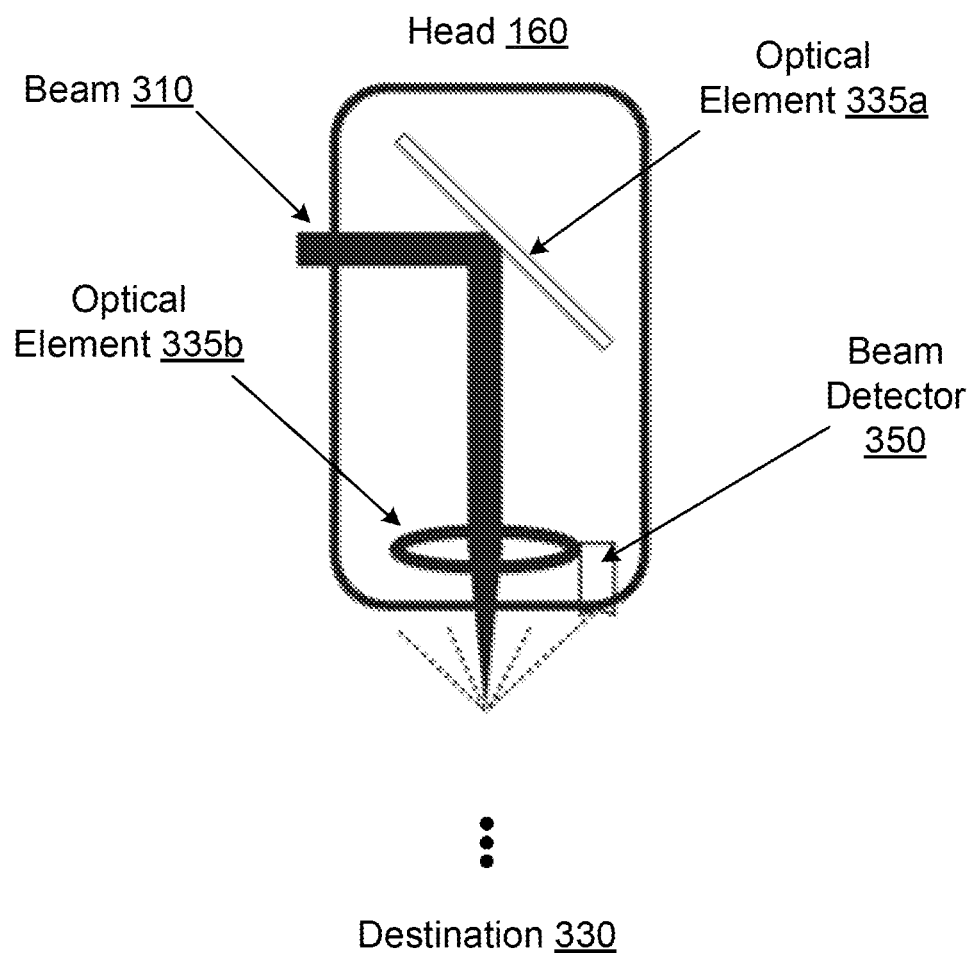
FIG. 4G depicts a block diagram illustrating another example configuration of a beam detector, consistent with implementations of the current subject matter.

FIG. 4G depicts a block diagram illustrating another example configuration of the beam detector 350, consistent with implementations of the current subject matter. In some implementations of the current subject matter, the beam detector 350 may measure the power of the beam 310 by at least measuring a power of the backscatter electromagnetic energy that is generated when the beam 310 interacts with the material 140. As noted, the head 160 of the beam 310 may be the head 160 of the computer numerically controlled machine 100, which may include the second optical element 335*b* (e.g., one or more lenses) configured to focus the beam 310 for delivery to the material 140. Accordingly, the beam detector 350 may be positioned and/or oriented relative to the head 160 including the second optical element 335*b* to be able to measure the power of the backscatter electromagnetic energy from the material 140.

In some implementations of the current subject matter, the beam detector 350 may include one or more sensors optimized for the wavelengths and/or frequencies associated with the beam 310. For example, the one or more sensors may be optimized for the detection of wavelengths and/or frequencies in the far infrared (FIR) region of the electromagnetic spectrum (e.g., wavelength spectrum of 15-1000 micrometers and/or frequency range of 0.3-20 terahertz). The one or more sensors may be thermopiles although the beam detector 350 may also include other types of sensors.

The signal detected by the beam detector 350 may originate from the electromagnetic energy emitted by the source 310 as well as from ambient noise such as, for example, heat, light, and/or the like. As such, in some implementations of the current subject matter, the beam detector 350 may apply one or more techniques in order to remove, from the signal detected at the beam detector 350, contributions from the ambient noise. For example, the signal may be filtered, for example, by applying a low pass filter and/or the like, to remove the effects of slow-changing ambient conditions such as heat, light, and/or the like. Alternatively and/or additionally, the beam detector 350 may include a differential sensor formed from multiple sensors (e.g., dual thermopiles). A first sensor (e.g., thermopile) may be oriented towards the source 310 of the electromagnetic energy while a second sensor (e.g., thermopile) may be oriented away from the source 310 of the electromagnetic energy. The difference between a first measurement made by the first sensor and a second measurement made by the second sensor may correspond to contributions from ambient noise (e.g., heat, light, and/or the like). Accordingly, in order to determine the power of the beam 310, the beam detector 350 may be configured to at least subtract a value corresponding to the contributions from ambient noise.

In some implementations of the current subject matter, the source 310 of electromagnetic energy may be configured to emit the electromagnetic energy (e.g., laser) in a series of pulses rather than a continuous signal. That is, the beam 310 may be formed from a series of pulses of electromagnetic energy. Accordingly, the beam detector 350 may be configured to detect the rising and/or falling edges of the pulses of electromagnetic energy. It should be appreciated that transients (e.g., signal oscillations) that occur at a known time may be more readily identified than a continuous signal.

In some implementations of the current subject matter, the beam detector 350 may include a detection circuit configured to compare the power of the beam 310 at a location along the path 340 to an expected power of the beam 310 at that location. For example, the beam detector 350 may measure the power of the beam 310 at the head 160. Furthermore, the beam detector 350 may compare the power of the beam 310 at the head 160 to an expected power of the beam 310 at the head 160. The expected power of the beam 310 at the head 160 (and/or a different location along the path 340) may be determined based on the power of the beam 310 at the source 310 as well as the attenuation of the power of the beam 310 as the beam 310 propagates from the source 310 to the head 160 (and/or a different location along the path 340). An interference of the beam 310 may be detected when a difference between the power of the beam 310 at the head 160 and the expected power of the beam 310 at the head 160 exceeds a threshold value.

In some implementations of the current subject matter, this threshold value may be determined based on one or more safety standards. The power of the beam 310 may not exceed a maximum permissible exposure (MPE) corresponding to a highest power (or energy density) of a beam of electromagnetic energy that is determined to be safe (e.g., to the human eye, skin, and/or the like) for the type of beam 310 (e.g., lasers). The maximum permissible exposure (MPE) associated with the beam 310 may be determined based on a wavelength of the electromagnetic energy, a spatial coherence (e.g., degree of collimation) of the beam 310, and/or an exposure time to the beam 310. An interference of the beam 310 may be detected when the power of the beam 310 exceeds the maximum permissible exposure (MPE) associated with the beam 310. For example, an interference of the beam 310 may be detected when the difference between the power of the beam 310 measured by the beam detector 350 and the expected power of the beam 310 at that location exceeds a threshold value determined based on the maximum permissible exposure (MPE) associated with the beam 310.

In some implementations of the current subject matter, the controller at the computer numerically controlled machine 100 may perform one or more actions in response to the beam controller 350 detecting an interference of the beam 310. For example, the controller at the computer numerically controlled machine 100 may respond to the beam detector 350 detecting an interference of the beam 310 by at least disabling the source 320. The source 320 may be disabled in order to minimize the damage caused by errant electromagnetic energy that may be generated when the beam 310 is diverted by one or more obstacles along the path 340. Alternatively and/or additionally, the controller at the computer numerically controlled machine 100 may respond to the beam detector 350 detecting an interference of the beam 310 by at least locking the lid 130 of the computer numerically controlled machine 100. Locking the lid 130 may prevent a user from accessing the interior space of the computer numerically controlled machine 100 when errant electromagnetic energy may be present within the computer numerically controlled machine 100. Furthermore, the controller at the computer numerically controlled machine 100 may respond to the beam detector 350 detecting an interference of the beam 310 by generating an alert. The alert may be displayed to the user at the computer numerically controlled machine 100 and/or at a device (e.g., a computer, a smartphone, a wearable apparatus, and/or the like) communicatively coupled with the compute numerically controlled machine 100.

Figure 5:
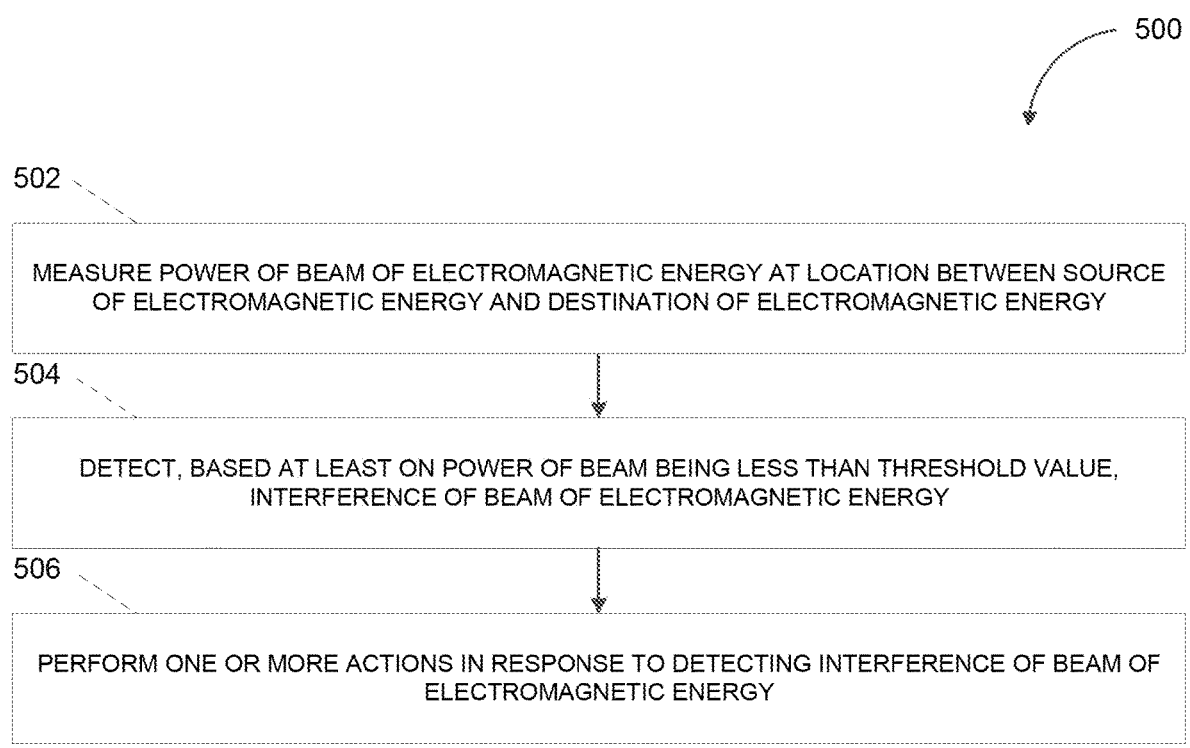
FIG. 5 is a flowchart illustrating a process for detecting an interference of electromagnetic energy in a compute numerically controlled machine, consistent with implementations of the current subject matter.

FIG. 5 is a process flow chart illustrating a process 500 for detecting an interference of a beam of electromagnetic energy in a computer numerically controlled machine, consistent with implementations of the current subject matter. Referring to FIGS. 1-3, 4A-F, and 5, the process 500 may be performed by the computer numerically controlled machine 100 to at least detect the interference of the beam 310.

At 502, a beam detector at a computer numerically controlled machine may measure a power of a beam of electromagnetic energy at a location between a source of the electromagnetic energy to a destination of the electromagnetic energy. For example, the computer numerically controlled machine 100 may include the beam detector 350 configured to measure the power of the beam 310 at a location between the source 320 and destination 330 of the beam 310 including, for example, at the head 160 of the computer numerically controlled machine 110 (and/or another location along the path 340 of the beam 310). In some implementations of the current subject matter, the beam detector 350 may measure the power of the beam 310 by sampling a portion of the beam 310. For instance, the beam detector 350 may measure the power of the beam 310 by measuring a power of the divergent rays from the beam 310. The beam detector 350 may also measure the power of the beam 310 by measuring a power of the backscatter electromagnetic energy generated by the beam 310 interacting with the second optical element 335b and/or the material 140. Alternatively and/or additionally, the beam detector 350 may measure the power of the beam 310 by measuring a power of a portion of the beam 310 diverted to the beam detector 350 by the bypass 410, the optical obstacle 420, and/or the third optical element 430.

At 504, the beam detector at the computer numerically controlled machine may detect, based at least on the power of the beam being less than a threshold value, an interference of the beam. For example, the beam detector 350 may detect an interference of the beam 310 based at least on the power of the beam 310 being less than a threshold value. Alternatively and/or additionally, the beam detector 350 may detect an interference of the beam 310 if a difference between the power of the beam 310 and an expected power of the beam 310 exceeds a threshold value. In some implementations of the current subject matter, the expected power of the beam 310 may be determined based on the power of the beam 310 at the source 310 as well as the attenuation of the power of the beam 310 as the beam 310 propagates from the source 310 to the destination 330 (and/or a different location along the path 340).

At 506, a controller at the computer numerically controlled machine may respond to the beam detector detecting the interference of the beam by performing one or more actions. In some implementations of the current subject matter, the controller at the computer numerically controlled machine 100 may perform one or more actions in response to the beam controller 350 detecting an interference of the beam 310. The one or more actions may include disabling the source 320 to prevent the source 320 from generating and/or emitting electromagnetic energy. Alternatively and/or additionally, the controller at the computer numerically controlled machine 100 may respond to the beam detector 350 detecting an interference of the beam 310 by engaging the interlock system and locking the lid 130 of the computer numerically controlled machine 100. Locking the lid 130 may prevent a user from accessing the interior space of the computer numerically controlled machine 100 when errant electromagnetic energy may be present within the computer numerically controlled machine 100.

The controller at the computer numerically controlled machine 100 may also generate an alarm (e.g., an audio alarm, a visual alarm, a haptic alarm, and/or the like) when the beam detector 350 detects an interference of the beam 310. Alternatively and/or additionally, the controller at the computer numerically controlled machine 100 and/or a cloud-based server communicatively coupled with the compute numerically controlled machine 100 may respond to the interference of the beam 310 by at least sending, to the user, a notification message (e.g., by email, short message service (SMS) message, and/or the like). Furthermore, in response to the beam detector detecting an interference of the beam 310, the controller at the computer numerically controlled machine 100 may generate and send, to the cloud-based server, a report including data collected by one or more sensors (e.g., cameras, microphones, gyroscopes, accelerometers, and/or the like) onboard the computer numerically controlled machine 100 over a time period during which the interference of the beam 310 occurred at the computer numerically controlled machine 100.

Figure 6:
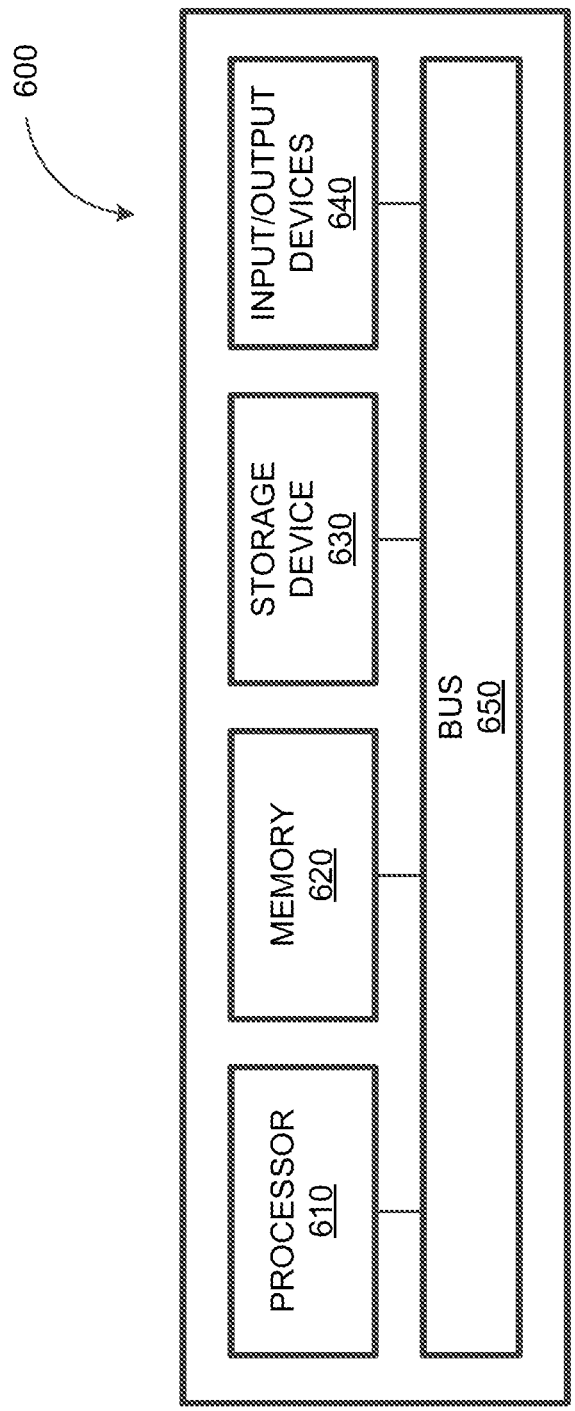
FIG. 6 depicts a block diagram illustrating a computing system, consistent with implementations of the current subject matter.

FIG. 6 depicts a block diagram illustrating a computing system 600, consistent with implementations of the current subject matter. Referring to FIGS. 1-3, 4A-F, and 5-6, the computing system 600 may implement the controller at the computer numerically machine 100 and/or any components therein.

As shown in FIG. 6, the computing system 600 can include a processor 610, a memory 620, a storage device 630, and an input/output device 640. The processor 610, the memory 620, the storage device 630, and the input/output device 640 can be interconnected via a system bus 650. The processor 610 is capable of processing instructions for execution within the computing system 600. Such executed instructions can implement one or more components of, for example, the pipeline engine 110. In some implementations of the current subject matter, the processor 610 can be a single-threaded processor. Alternately, the processor 610 can be a multi-threaded processor. The processor 610 is capable of processing instructions stored in the memory 620 and/or on the storage device 630 to control at least some of the operations of the computer numerically controlled machine 100.

The memory 620 is a computer readable medium such as volatile or non-volatile that stores information within the computing system 600. The memory 620 can store data structures representing configuration object databases, for example. The storage device 630 is capable of providing persistent storage for the computing system 600. The storage device 630 can be a solid state drive, a floppy disk device, a hard disk device, an optical disk device, or a tape device, or other suitable persistent storage means. The input/output device 640 provides input/output operations for the computing system 600. In some implementations of the current subject matter, the input/output device 640 can provide input/output operations for a network device. For example, the input/output device 640 can include Ethernet ports or other networking ports to communicate with one or more wired and/or wireless networks (e.g., a local area network (LAN), a wide area network (WAN), the Internet).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

The invention claimed is:

1. A computer-numerically-controlled (CNC) machine comprising:
    at least one processor;
    at least one non-transitory computer-readable medium; and
    program instructions stored on the at least one non-transitory computer-readable medium that are executable by the at least one processor such that the CNC machine is configured to:
        measure a power of a beam of electromagnetic energy at a location between a source of the electromagnetic energy and a destination in the CNC machine, the beam of electromagnetic energy traveling from the source to the destination being susceptible to one or more interferences, and the one or more interferences being capable of altering the power of the beam of electromagnetic energy by at least diverting, away from an intended path for the beam of electromagnetic energy, at least a portion of the beam of electromagnetic energy;
        detect, based at least on the measured power of the beam of electromagnetic energy being less than a threshold value, an interference of the beam of electromagnetic energy; and
        in response to detecting the interference of the beam of electromagnetic energy, perform one or more actions.

2. The CNC machine of claim 1, further comprising program instructions that are executable by the at least one processor such that the CNC machine is configured to:
    deliver, to the destination in the CNC machine, the beam of electromagnetic energy.

3. The CNC machine of claim 2, further comprising:
    the source of the electromagnetic energy;
    a head; and
    program instructions that are executable by the at least one processor such that the CNC machine is configured to:
        steer, via the head, the beam of electromagnetic energy from the source to the destination.

4. The CNC machine of claim 3, wherein the program instructions that are executable by the at least one processor such that the CNC machine is configured to measure the power of the beam of electromagnetic energy comprise program instructions that are executable by the at least one processor such that the CNC machine is configured to measure the power of the beam of electromagnetic energy by at least measuring a power of a backscatter from the beam of electromagnetic energy interacting with one or more components at the head.

5. The CNC machine of claim 1, wherein the program instructions that are executable by the at least one processor such that the CNC machine is configured to measure the power of the beam of electromagnetic energy comprise program instructions that are executable by the at least one processor such that the CNC machine is configured to measure the power of the beam of electromagnetic energy by at least measuring a power of one or more divergent rays scattered from the beam of electromagnetic energy.

6. The CNC machine of claim 1, wherein the program instructions that are executable by the at least one processor such that the CNC machine is configured to measure the power of the beam of electromagnetic energy comprise program instructions that are executable by the at least one processor such that the CNC machine is configured to measure the power of the beam of electromagnetic energy by at least measuring a power of a backscatter from the beam of electromagnetic energy delivered at the destination.

7. The CNC machine of claim 1, wherein the program instructions that are executable by the at least one processor such that the CNC machine is configured to measure the power of the beam of electromagnetic energy comprise program instructions that are executable by the at least one processor such that the CNC machine is configured to measure the power of the beam of electromagnetic energy by at least measuring a power of a portion of the beam of electromagnetic energy.

8. The CNC machine of claim 1, further comprising program instructions that are executable by the at least one processor such that the CNC machine is configured to:
 determine an expected power of the beam of electromagnetic energy at the location between the source of the electromagnetic energy and the destination; and
 detect the interference of the beam of electromagnetic energy further based on a difference between the power of the beam of electromagnetic energy and the expected power of the beam of electromagnetic energy exceeding another threshold value.

9. The CNC machine of claim 1, further comprising:
 the source of the electromagnetic energy;
 a first sensor oriented towards the source of the electromagnetic energy;
 a second sensor oriented away from the source of the electromagnetic energy; and
 program instructions that are executable by the at least one processor such that the CNC machine is configured to:
  generate, via the first sensor oriented towards the source of the electromagnetic energy, a first measurement;
  generate, via the second sensor oriented away from the source of the electromagnetic energy, a second measurement; and
  determine, based at least on a difference between the first measurement and the second measurement, the power of the beam of electromagnetic energy, the difference between the first measurement and the second measurement corresponding to a contribution from an ambient noise, and the power of the beam of electromagnetic energy being determined by at least removing the contribution from the ambient noise.

10. The CNC machine of claim 1, wherein the program instructions that are executable by the at least one processor such that the CNC machine is configured to, in response to detecting the interference of the beam of electromagnetic energy, perform the one or more actions comprise program instructions that are executable by the at least one processor such that the CNC machine is configured to perform at least one of:
 (i) generate an alarm,
 (ii) send a notification to a user,
 (iii) disable the source of the electromagnetic energy,
 (iv) engage an interlock of the CNC machine, or
 (v) send, to a cloud-based server, data collected by one or more sensors onboard the CNC machine, wherein the data is collected over a time period during which the interference of the beam of electromagnetic energy occurred at the CNC machine.

11. A non-transitory computer-readable storage medium, wherein the non-transitory computer-readable storage medium is provisioned with program instructions that, when executed by at least one processor, cause a computer-numerically-controlled (CNC) machine to:
 measure a power of a beam of electromagnetic energy at a location between a source of the electromagnetic energy and a destination in the CNC machine, the beam of electromagnetic energy traveling from the source to the destination being susceptible to one or more interferences, and the one or more interferences being capable of altering the power of the beam of electromagnetic energy by at least diverting, away from an intended path for the beam of electromagnetic energy, at least a portion of the beam of electromagnetic energy;
 detect, based at least on the measured power of the beam of electromagnetic energy being less than a threshold value, an interference of the beam of electromagnetic energy; and
 in response to detecting the interference of the beam of electromagnetic energy, perform one or more actions.

12. The non-transitory computer-readable storage medium of claim 11, wherein the non-transitory computer-readable storage medium is also provisioned with program instructions that, when executed by at least one processor, cause the CNC machine to:
 deliver, to the destination in the CNC machine, the beam of electromagnetic energy.

13. The non-transitory computer-readable storage medium of claim 12, wherein the CNC machine comprises (i) the source of the electromagnetic energy and (ii) a head, and wherein the non-transitory computer-readable storage medium is also provisioned with program instructions that, when executed by at least one processor, cause the CNC machine to:
 steer, via the head, the beam of electromagnetic energy from the source of the electromagnetic energy to the destination.

14. The non-transitory computer-readable storage medium of claim 13, wherein the program instructions that, when executed by at least one processor, cause the CNC machine to measure the power of the beam of electromagnetic energy comprise program instructions that, when executed by at least one processor, cause the CNC machine to measure the power of the beam of electromagnetic energy by at least measuring a power of a backscatter from the beam of electromagnetic energy interacting with one or more components at the head.

15. The non-transitory computer-readable storage medium of claim 11, wherein the program instructions that, when executed by at least one processor, cause the CNC machine to measure the power of the beam of electromagnetic energy comprise program instructions that, when executed by at least one processor, cause the CNC machine to measure the power of the beam of electromagnetic energy by at least measuring a power of one or more divergent rays scattered from the beam of electromagnetic energy.

16. The non-transitory computer-readable storage medium of claim 11, wherein the program instructions that, when executed by at least one processor, cause the CNC machine to measure the power of the beam of electromagnetic energy comprise program instructions that, when executed by at least one processor, cause the CNC machine to measure the power of the beam of electromagnetic energy by at least measuring a power of a backscatter from the beam of electromagnetic energy delivered at the destination.

17. The non-transitory computer-readable storage medium of claim 11, wherein the program instructions that, when executed by at least one processor, cause the CNC machine to measure the power of the beam of electromagnetic energy comprise program instructions that, when executed by at least one processor, cause the CNC machine to measure the power of the beam of electromagnetic energy by at least measuring a power of a portion of the beam of electromagnetic energy.

18. The non-transitory computer-readable storage medium of claim 11, wherein the non-transitory computer-readable storage medium is also provisioned with program instructions that, when executed by at least one processor, cause the CNC machine to:
    determine an expected power of the beam of electromagnetic energy at the location between the source of the electromagnetic energy and the destination; and
    detect the interference of the beam of electromagnetic energy further based on a difference between the power of the beam of electromagnetic energy and the expected power of the beam of electromagnetic energy exceeding another threshold value.

19. The non-transitory computer-readable storage medium of claim 11, wherein the CNC machine comprises (i) the source of the electromagnetic energy, (ii) a first sensor oriented towards the source of the electromagnetic energy, and (iii) a second sensor oriented away from the source of the electromagnetic energy, and wherein the non-transitory computer-readable storage medium is also provisioned with program instructions that, when executed by at least one processor, cause the CNC machine to:
    generate, via the first sensor oriented towards the source of the electromagnetic energy, a first measurement;
    generate, via the second sensor oriented away from the source of the electromagnetic energy, a second measurement; and
    determine, based at least on a difference between the first measurement and the second measurement, the power of the beam of electromagnetic energy, the difference between the first measurement and the second measurement corresponding to a contribution from an ambient noise, and the power of the beam of electromagnetic energy being determined by at least removing the contribution from the ambient noise.

20. The non-transitory computer-readable storage medium of claim 11, wherein the program instructions that, when executed by at least one processor, cause the CNC machine to, in response to detecting the interference of the beam of electromagnetic energy, perform the one or more actions comprise program instructions that, when executed by at least one processor, cause the CNC machine to perform at least one of:
    (i) generate an alarm,
    (ii) send a notification to a user,
    (iii) disable the source of the electromagnetic energy,
    (iv) engage an interlock of the CNC machine, or
    (v) send, to a cloud-based server, data collected by one or more sensors onboard the CNC machine, wherein the data is collected over a time period during which the interference of the beam of electromagnetic energy occurred at the CNC machine.

\* \* \* \* \*